United States Patent
Sato et al.

(10) Patent No.: US 9,948,054 B2
(45) Date of Patent: Apr. 17, 2018

(54) VACUUM CONTAINER OF LASER OSCILLATOR

(71) Applicant: FANUC CORPORATION, Minamitsuru-gun, Yamanashi (JP)

(72) Inventors: Takanori Sato, Yamanashi (JP); Tetsuhisa Takazane, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/229,533

(22) Filed: Aug. 5, 2016

(65) Prior Publication Data

US 2017/0047702 A1 Feb. 16, 2017

(30) Foreign Application Priority Data

Aug. 12, 2015 (JP) ................ 2015-159488

(51) Int. Cl.
*H01S 3/036* (2006.01)
*H01S 3/03* (2006.01)
*H01S 3/223* (2006.01)

(52) U.S. Cl.
CPC ............... *H01S 3/03* (2013.01); *H01S 3/036* (2013.01); *H01S 3/2232* (2013.01)

(58) Field of Classification Search
CPC ......... H01S 3/03–3/0388; H01S 3/0401; F16J 15/002–15/008; F16J 15/0881–15/0893
See application file for complete search history.

(56) References Cited

U.S. PATENT DOCUMENTS

| | | | | |
|---|---|---|---|---|
| 3,915,460 A | * | 10/1975 | Kramer | F16J 15/002 277/618 |
| 4,529,211 A | * | 7/1985 | Rodgers | F16L 17/10 277/626 |
| 6,494,465 B1 | * | 12/2002 | Bucknell | F16J 15/0887 277/558 |
| 2002/0007472 A1 | | 1/2002 | Ko et al. | |
| 2002/0153669 A1 | * | 10/2002 | Caplain | F16J 15/0893 277/606 |
| 2002/0153672 A1 | * | 10/2002 | Caplain | F16J 15/0893 277/608 |
| 2002/0196830 A1 | * | 12/2002 | Ujazdowski | G03F 7/70025 372/55 |

(Continued)

FOREIGN PATENT DOCUMENTS

| | | | | |
|---|---|---|---|---|
| GB | 1016310 A | * | 1/1966 | ............ F02F 11/002 |
| JP | 62151669 A | | 7/1987 | |
| JP | 63172080 A | | 7/1988 | |

(Continued)

*Primary Examiner* — Joshua King
(74) *Attorney, Agent, or Firm* — RatnerPrestia (57) ABSTRACT

A vacuum container of a laser oscillator includes a first sealing member and a second sealing member that are disposed between a tube and an insertion member. The first sealing member is made of a material having a corrosion resistance higher than the second sealing member, the first sealing member is disposed on a vacuum side relative to the second sealing member, the second sealing member is made of a material having a sealing property higher than the first sealing member, and the first sealing member at least partially includes a deformation portion that deforms in such a manner as to enhance a sealing property thereof.

6 Claims, 8 Drawing Sheets

(56) References Cited

U.S. PATENT DOCUMENTS

2003/0057655 A1* 3/2003 Chehab ................ F16J 15/008
  277/500

FOREIGN PATENT DOCUMENTS

| JP | 63226982 A | 9/1988 |
|----|---|---|
| JP | 01144567 A | 6/1989 |
| JP | 10050658 A | 2/1998 |
| JP | 2000-106298 A | 4/2000 |
| JP | 2001305744 A | 11/2001 |
| JP | WO2004/038781 A1 | 5/2004 |
| JP | 2007-092892 A | 4/2007 |
| JP | 2007120738 A | 5/2007 |
| JP | 2009144735 A | 7/2009 |
| JP | 2014126130 A | 7/2014 |

* cited by examiner

VACUUM CONTAINER OF LASER OSCILLATOR

BACKGROUND OF THE INVENTION

1. Field of the Invention

The present invention relates to a vacuum container of a laser oscillator, and more particularly to a vacuum container of a laser oscillator including a first sealing member and a second sealing member that are disposed between a tube and an insertion member.

2. Description of the Related Art

A vacuum container of a high-speed axial flow-type carbon dioxide gas laser oscillator includes a resonator containing a laser gas, a discharge portion that excites the laser gas, a blower that circulates the laser gas, and a heat exchanger that cools heat generated in the discharge portion and compression heat of the blower.

Figure 11:
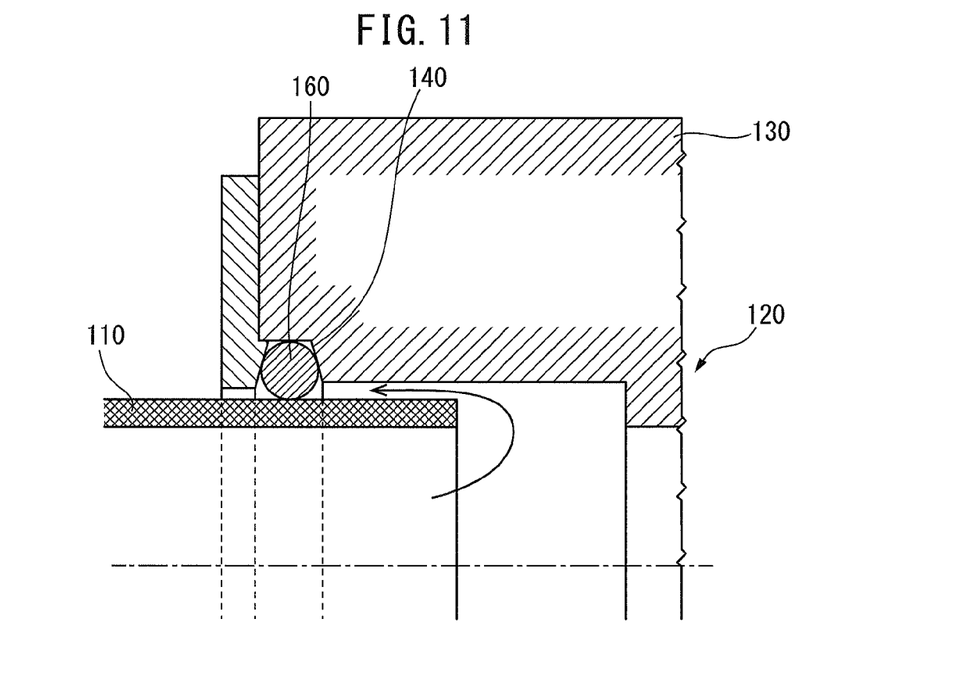
FIG. 11 is a partial cross-sectional view of a vacuum container according to a conventional technique.

FIG. 11 is a partial cross-sectional view of a vacuum container according to a conventional technique. As illustrated in FIG. 11, the vacuum container includes a tube 110 made of aluminum and an insertion member 120 made of stainless steel including a flange 130 into which the tube 110 is inserted. Note that tube 110 and insertion member 120 may be made of other materials. Then, a groove portion 140 is formed on an inner peripheral surface of the flange 130 of the insertion member 120. An O-ring 160 is disposed in the groove portion 140, thereby providing a seal between the tube 110 and the insertion member 120.

There is a case in which a part of the laser gas that has passed the discharge portion (unillustrated in FIG. 11) is ionized and, as indicated by an arrow in FIG. 11, passes through a gap between the tube 110 and the flange 130 and reaches the O-ring 160. In such a case, the O-ring 160 is oxidized and/or eroded, so that a sealing property of the O-ring 160 lowers.

A degree of progression of the oxidation and/or erosion of the O-ring 160 is determined in accordance with a longitudinal distance of the gap between the tube 110 and the flange 130 and a contact area (a degree of opening) of the O-ring 160 relative to the laser gas. In other words, the shorter the longitudinal distance as described above is and the greater the contact are is, the sooner the O-ring 160 is oxidized and/or eroded. Since, as illustrated in FIG. 5, the O-ring disposed on a peripheral surface of the tube 110 has a relatively large contact area, there is a problem in that an exchange cycle of the O-ring 160 is short.

Since the O-ring thus has a low corrosion resistance, in semiconductor manufacturing devices and seal devices that use a corrosive gas in a vacuum system, a sealing member made of a metal, a sealing member made of a resin having corrosion resistance, and the like are used in place of the O-ring. However, there has been a problem in that the sealing member made of a metal and the sealing member made of a resin having a corrosion resistance have a low elastic property and cannot be reused when once deformed.

Figure 12:
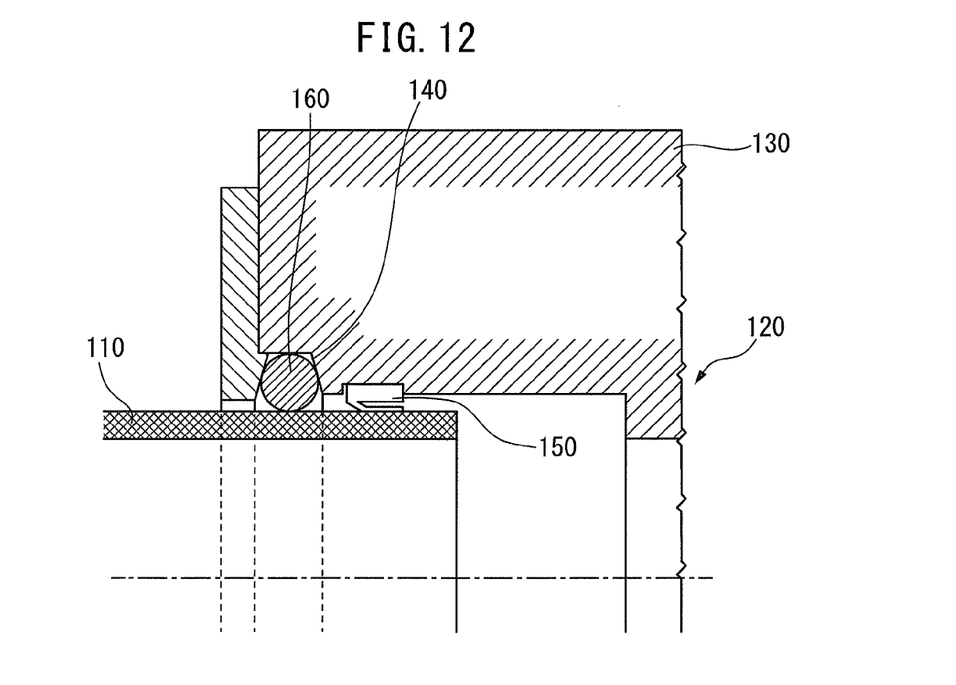
FIG. 12 is another partial cross-sectional view of the vacuum container according to the conventional technique.

Thus, in Japanese Laid-open Patent Publication No. 2007-92892, Japanese Laid-open Patent Publication No. 2000-106298, and Re-publication of PCT international application No. 2004/038781, a sealing member having a high corrosion resistance that is disposed on a vacuum side and a sealing member having a high elastic property that is disposed on an atmosphere side are used together. In particular, Re-publication of PCT international application No. 2004/038781 discloses, for example, as illustrated in FIG. 12, disposing the O-ring 160 as the sealing member having a high elastic property that is disposed on the atmosphere side and disposing an elastic member having a V-shaped cross section as the sealing member 150 disposed on the vacuum side.

SUMMARY OF INVENTION

However, after the O-ring 160 and the sealing member 150 are disposed, evacuating a region between the O-ring 160 and the sealing member 150 is difficult. There is a case in which, during operation of the laser oscillator, an atmospheric gas in the region between the O-ring 160 and the sealing member 150 is gradually mixed in a laser gas circulation system. As a result, there has been a problem in that a mixture percentage of the laser gas that is optimized in advance is changed, and a property of the laser oscillator becomes unstable.

In addition, there has also been a problem in that, since the O-ring 160 and/or the sealing member 150 are required to be in contact with the tube 110 and the flange 130, a degree of freedom of assembling the tube 110 and the flange 130 is low and assembling the tube and the insertion member is difficult.

The present invention has been achieved in view of such circumstances, and an object of the present invention is to provide a vacuum container of a laser oscillator that easily configures a region between two sealing members to be vacuum, thereby capable of blocking a corrosive gas in a laser gas.

To achieve the object as described above, according to the first invention, provided is a vacuum container of a laser oscillator, the vacuum container including a tube having a cylindrical shape or a polygonal cylindrical shape, an insertion member into which the tube is inserted, and a first sealing member and a second sealing member that are disposed between the tube and the insertion member, in which the first sealing member is made of a material having a corrosion resistance higher than the second sealing member, the first sealing member is disposed on a vacuum side relative to the second sealing member, the second sealing member is made of a material having a sealing property higher than the first sealing member, and the first sealing member at least partially includes a deformation portion that deforms in such a manner as to enhance a sealing property thereof.

According to the second invention, in the first invention, the deformation portion holds the first sealing member while a sealing property thereof is enhanced.

According to the third invention, in the first or second invention, the deformation portion is deformed due to reduction of a pressure around the first sealing member.

According to the fourth invention, in the first or second invention, the deformation portion is a shape memory metal or a shape memory resin that is contained in the first sealing member.

According to the fifth invention, in the first or second invention, the deformation portion contains a volatile component and is disposed in a cutout of the first sealing member, and the deformation portion is deformed due to volatilization of the volatile component.

According to the sixth invention, in any one of the first to fifth inventions, a part of the first sealing member is held between the second sealing member and the insertion member.

According to the seventh invention, in any one of the first to sixth inventions, at least a part of the first sealing member is made of a fluorine resin.

These objects, features, and advantages of the present invention and other objects, features, and advantages will be clearer based on the detailed description of typical embodiments of the present invention that are illustrated in the accompanying drawings.

DETAILED DESCRIPTION

Hereinafter, embodiments of the present invention will be described with reference to the accompanying drawings. In the following drawings, similar members are assigned similar reference signs. To facilitate understanding, these drawings are suitably changed in scale.

Figure 1:
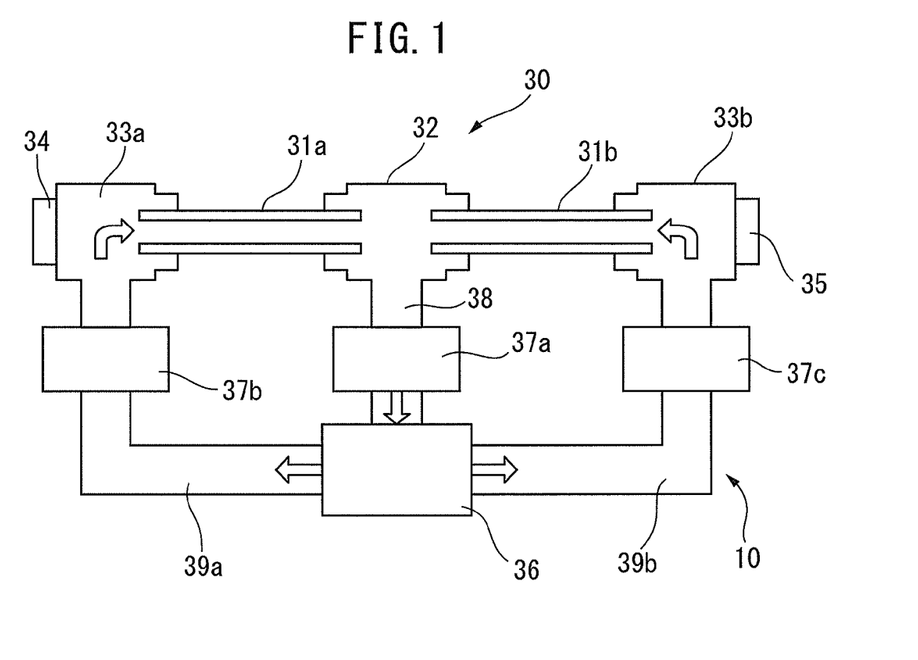
FIG. 1 is a schematic diagram illustrating a laser oscillator including a vacuum container according to the present invention.

FIG. 1 is a schematic diagram illustrating a laser oscillator including a vacuum container according to the present invention. A laser oscillator 30 as illustrated in FIG. 1 is, for example, a carbon dioxide gas laser oscillator. In FIG. 1, the laser oscillator 30 includes discharge tubes 31a, 31b arranged in series, a center block 32 connecting these discharge tubes 31a, 31b to each other, and end portion blocks 33a, 33b respectively connected to one end of the discharge tube 31a and the other end of the discharge tube 31b.

As illustrated, a suction tube passage 38 for sucking a laser medium that is a gas from between the discharge tube 31a and the discharge tube 31b extends from the center block 32. In addition, return tube passages 39a, 39b for respectively discharging the laser medium to the end portion blocks 33a, 33b extend.

As illustrated in FIG. 1, an output mirror 34 and a rear mirror 35 are respectively disposed at the one end of the discharge tube 31a and the other end of the discharge tube 31b. Then, an optical oscillation space is formed between the output mirror 34 and the rear mirror 35. In addition, although unillustrated, a pair of electrodes is disposed in such a manner as to sandwich the discharge tubes 31a, 31b, respectively.

Further, as illustrated in FIG. 1, the suction tube passage 38 extending from the center block 32 has an end at a turbo blower 36. The turbo blower 36 returns a laser gas to the two return tube passages 39a, 39b respectively extending from left and right ends of the turbo blower 36 to the end portion blocks 33a, 33b and circulates the laser gas.

In addition, the suction tube passage 38 is provided with a first heat exchanger 37a and the return tube passages 39a, 39b are provided with a second heat exchanger 37b and a third heat exchanger 37c, respectively. These first heat exchanger 37a to third heat exchanger 37c perform a function of cooling heat generated in the discharge tubes and compression heat of the turbo blower 36.

The discharge tubes 31a, 31b, the center block 32, the end portion blocks 33a, 33b, the suction tube passage 38, and the return tube passages 39a, 39b are connected to one another and form a sealed vacuum container 10. In the vacuum container 10, a predetermined laser gas is sealed while blocked from the atmosphere. As the laser gas, a medium gas for laser oscillation containing a laser medium, such as a carbon dioxide gas, a nitrogen gas, and a helium gas, at a predetermined percentage is used and may contain a corrosive gas.

Figure 2:
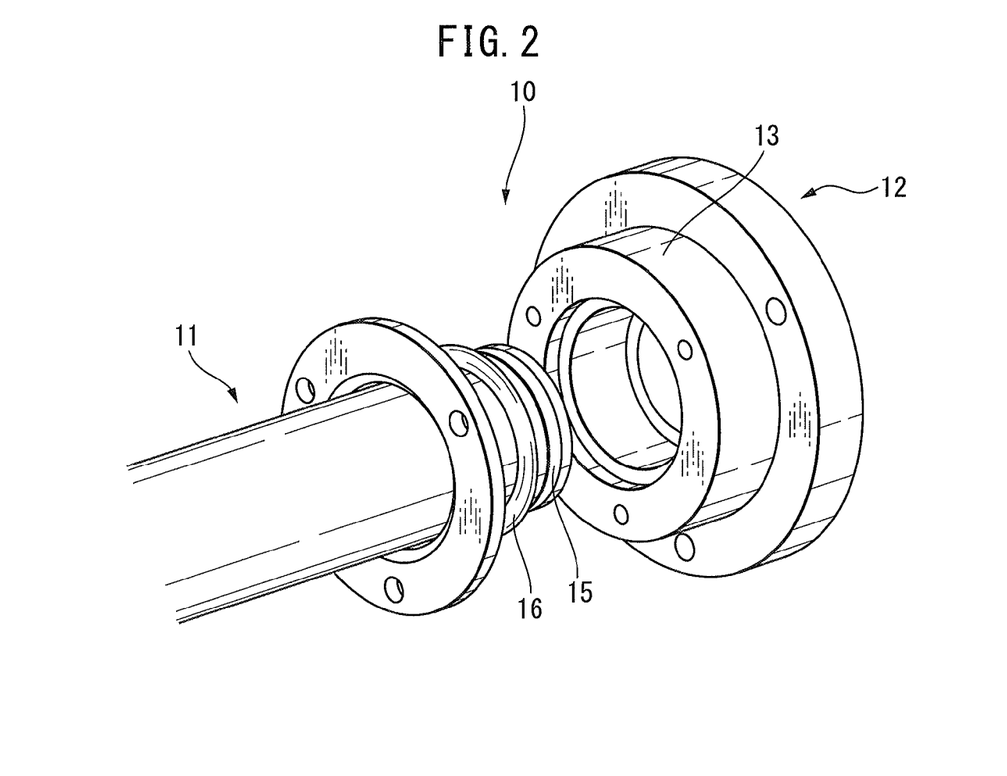
FIG. 2 is a partial perspective view of the vacuum container according to the present invention.

FIG. 2 is a partial perspective view of the vacuum container according to the present invention. In FIG. 2, a part of the vacuum container 10 is illustrated, and the vacuum container 10 includes a tube member 11 and an insertion member 12 into which the tube member 11 is inserted. The tube member 11 is, for example, the discharge tubes 31a, 31b, the suction tube passage 38, and the return tube passages 39a, 39b. In addition, the insertion member 12 is, for example, the center block 32, and the end portion blocks 33a, 33b. Note that the tube member 11 may have a cylindrical shape or a polygonal cylindrical shape, and an insertion cross section of the insertion member 12 may have a shape corresponding thereto. Hereinafter, the vacuum container 10 is made of at least one tube member 11 and at least one insertion member 12.

Figure 3A:
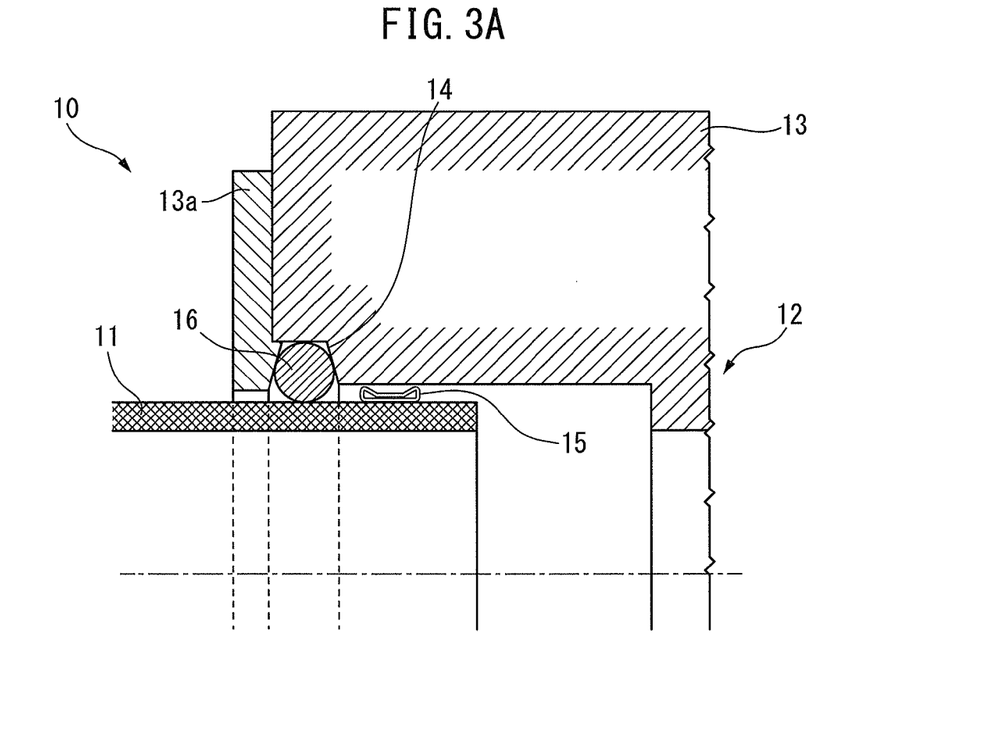
FIG. 3A is a partial cross-sectional view of the vacuum container according to a first embodiment of the present invention.
Figure 3B:
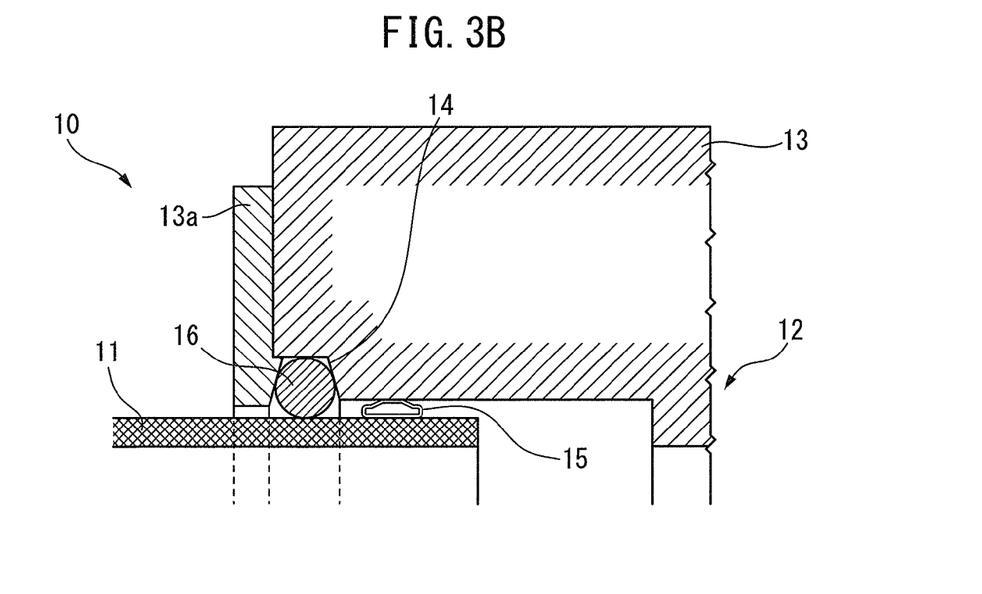
FIG. 3B is another partial cross-sectional view of the vacuum container according to the first embodiment of the present invention.

FIGS. 3A and 3B are a partial cross-sectional view of the vacuum container according to a first embodiment of the present invention. As illustrated in FIG. 2 to FIG. 3B, a first sealing member 15 and a second sealing member 16 that have a ring shape are disposed in order on a peripheral surface of the tube member 11. The first sealing member 15 is disposed on a distal end side of the tube member 11 relative to the second sealing member 16. Since an interior space of the tube member 11 and the insertion member 12 may be evacuated, the first sealing member 15 can be considered to be disposed on a vacuum side relative to the second sealing member 16.

The first sealing member 15 and the second sealing member 16 both may be an elastic member. The first sealing member 15 is at least partially made of a material having a corrosion resistance higher than the second sealing material 16, for example, a fluorine resin, such as Teflon (registered trademark). The second sealing member 16 is preferably made of a material having a sealing property higher than the first sealing material 15, for example, a fluorine rubber. In an embodiment, the second sealing member 16 is an O-ring made of a fluorine rubber.

While the first sealing member 15 and the second sealing member 16 are disposed, the tube member 11 is inserted into the flange 13 of the insertion member 12. Thereby, the second sealing member 16 is disposed in a groove portion 14 formed on an inner peripheral surface of the flange 13. Subsequently, a lid portion 13a is disposed on an end surface of the flange 13 and fastened by a bolt, thereby compressing the second sealing member 16 and providing a seal. Note that the tube member 11 may be inserted into the insertion member 12 on which at least one of the first sealing member 15 and the second sealing member 16 are disposed in advance.

Figure 4A:
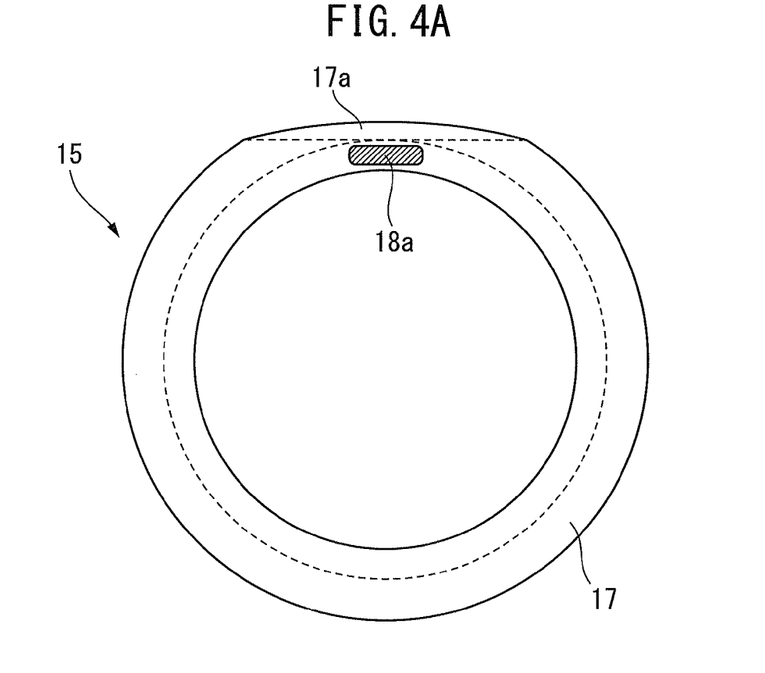
FIG. 4A is a front view of a first sealing member according to an example.
Figure 4B:
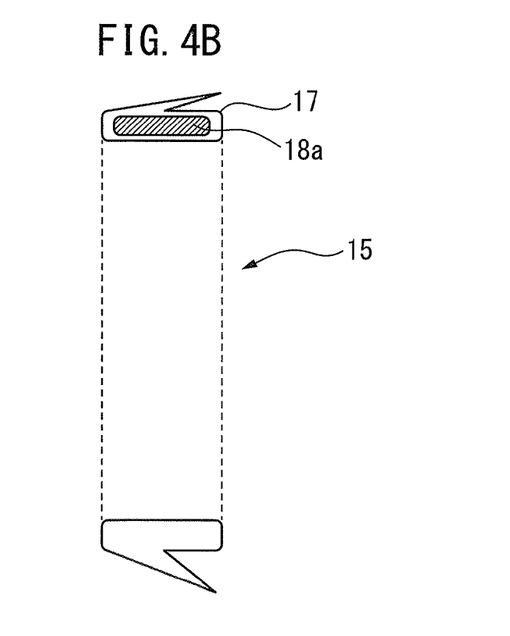
FIG. 4B is a cross-sectional view of the first sealing member as illustrated in FIG. 4A.

FIG. 4A is a front view of a first sealing member according to an example, and FIG. 4B is a cross-sectional view of the first sealing member. As illustrated in these drawings, the first sealing member 15 is a ring-shaped member and includes a deformation portion 18a and an outer skin portion 17 surrounding the deformation portion 18a. The outer skin portion 17 is made of a fluorine resin as described above. As illustrated in FIG. 4A, the deformation portion 18a is contained only at a part in the vicinity of an inner peripheral surface of the first sealing member 15. Further, as illustrated in FIG. 4B, the deformation portion 18a extends over substantially the entirety in an axial direction of the first sealing member 15. Note that the deformation portion 18a may be disposed in the vicinity of the inner peripheral surface of the first sealing member 15 over the entirety in a circumferential direction.

Figure 5A:
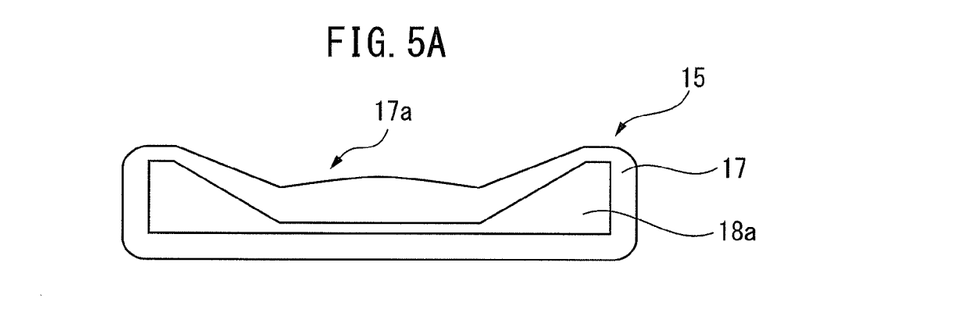
FIG. 5A is a partial cross-sectional view illustrating a first example of the first sealing member.

Moreover, FIG. 5A is a partial cross-sectional view illustrating a first example of the first sealing member, in which a state under the atmospheric pressure is illustrated. The outer skin portion 17 includes a recessed portion 17a adjacent to the deformation portion 18a partially on an outer peripheral surface thereof. The deformation portion 18a as illustrated in these drawings is a hollow portion, in which a gas at a predetermined pressure slightly higher than the atmospheric pressure is sealed.

Figure 5B:
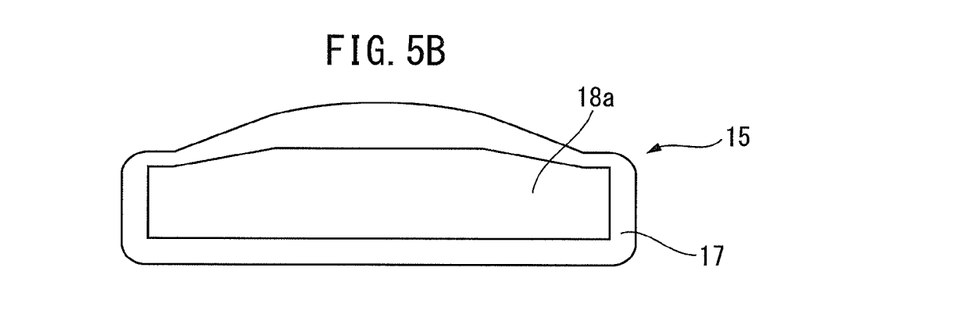
FIG. 5B is another partial cross-sectional view illustrating the first example of the first sealing member.

As illustrated in FIG. 3A, the first sealing member 15 and the second sealing member 16 are disposed in the vacuum container 10, and then the vacuum container 10 is evacuated. As evacuation starts, an interior space of the vacuum container 10 and a region between the first sealing member 15 and the second sealing member 16 are gradually decompressed. Then, when a pressure around the first sealing member 15 lowers than a pressure of the deformation portion 18a, the outer skin portion 17 of the first sealing member 15 starts to expand as illustrated in FIG. 5B. Particularly the recessed portion 17a of the outer skin 17 expands in a manner protruding outward. Accordingly, the outer skin 17 of the first sealing member 15 expands so that the first sealing member 15 itself is deformed.

Finally, as illustrated in FIG. 3B, the first sealing member 15 fills a gap between the tube member 11 and the flange 13 of the insertion member 12. As a result, the first sealing member 15 can perform a sealing performance thereof. In other words, the deformation portion 18a is deformed in such a manner as to enhance the sealing performance of the first sealing member 15.

Further, after the deformation portion 18a expands, the outer skin portion 17 has strength and an elastic property sufficient to maintain a deformation state thereof. Thus, even after the laser oscillator 30 stops and the laser gas is purged, the deformation state of the first sealing member 15 is maintained. Note that when a surrounding pressure of the first sealing member 15 increases, the first sealing member 15 is restored into an original shape.

Thus, in the present invention, the deformation portion 18a of the first sealing member 15 is deformed after evacuation starts, so that the region between the first sealing member 15 and the second sealing member 16 can be easily evacuated. Note that adjusting a pressure in the deformation portion 18a also allows the deformation portion 18a to be deformed at the same time evacuation starts. In the present invention, an atmospheric gas in the region between the first sealing member 15 and the second sealing member 16 can be removed, so that the atmospheric gas in the region between the first sealing member 15 and the second sealing member 16 fails to be gradually mixed in a laser gas circulation system and a property of the laser oscillator fails to be unstable due to a change of a mixture percentage of the laser gas that is optimized in advance.

Further, in the present invention, the first sealing member 15 having a high corrosion resistance is disposed on the vacuum side, so that a corrosive gas in the laser gas is prevented from reaching the second sealing member 16 and deterioration of the second sealing member 16 can be further restrained. As a result, an exchange cycle of the first sealing member 15 and the second sealing member 16 can be made to be long.

Further, in the present invention, a groove portion for the first sealing member 15 is unrequired to be formed on the flange 13 of the insertion member 12. Accordingly, the insertion member 12 can be manufactured at a low cost and the first sealing member 15 can be easily assembled. Thus, the first sealing member 15 can be easily mounted afterwards on the vacuum container 10 of the existing laser oscillator 30.

Further, in the present invention, the second sealing member 16 is not always required to have a high corrosion resistance so that a cheap material, such as a fluorine resin, can be employed for the second sealing member 16. Further, in the present invention, a contact area (a degree of opening) between the corrosive gas and the second sealing member 16 is reduced so that deterioration of the second sealing member 16 can be further restrained.

Figure 6A:
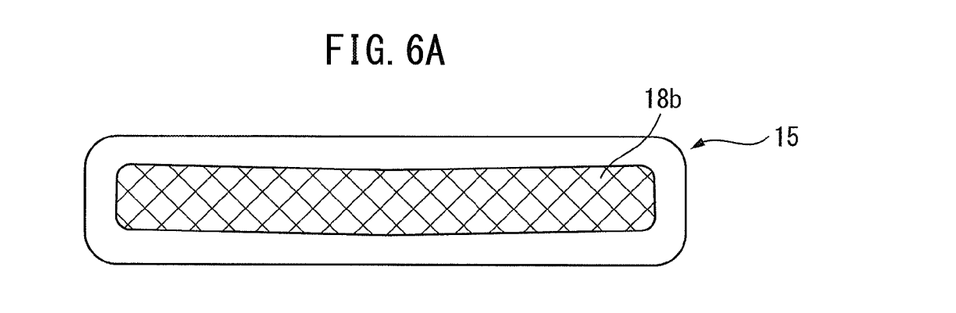
FIG. 6A is a partial cross-sectional view illustrating a second example of the first sealing member.
Figure 6B:
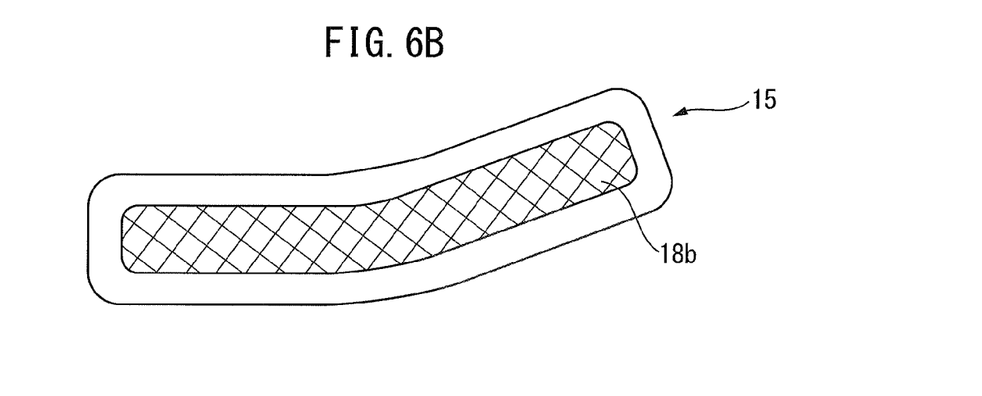
FIG. 6B is another partial cross-sectional view illustrating the second example of the first sealing member.

Further, FIG. 6A is a partial cross-sectional view illustrating a second example of the first sealing member, and FIG. 6B is another partial cross-sectional view illustrating the second example of the first sealing member. The first sealing member 15 as illustrated in FIGS. 6A and 6B includes a deformation portion 18b and the outer skin portion 17 surrounding the deformation portion 18b. In addition, the deformation portion 18b is made of a shape memory metal or a shape memory resin.

Figure 7A:
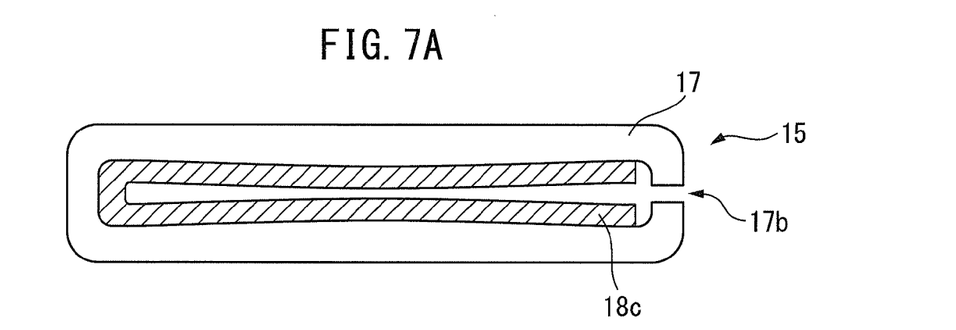
FIG. 7A is a partial cross-sectional view illustrating a third example of the first sealing member.
Figure 7B:
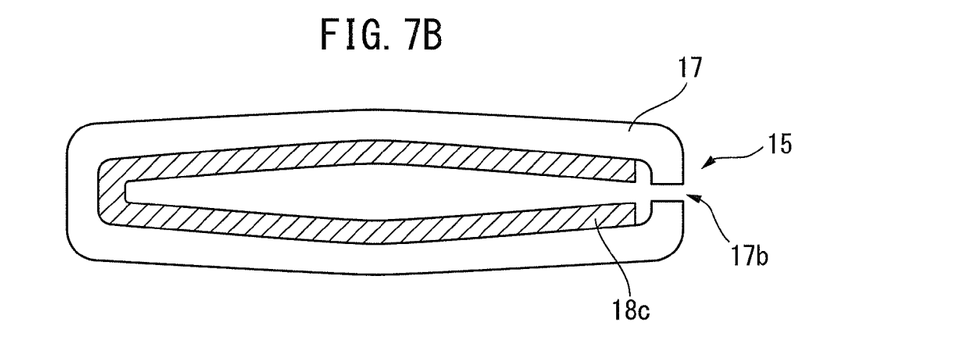
FIG. 7B is another partial cross-sectional view illustrating the third example of the first sealing member.

Further, FIG. 7A is a partial cross-sectional view illustrating a third example of the first sealing member, and FIG. 7B is another partial cross-sectional view illustrating the third example of the first sealing member. The first sealing member 15 as illustrated in FIGS. 7A and 7B includes a deformation portion 18c having a substantially U-shape and the outer skin portion 17 surrounding the deformation portion 18c. Apparent from the drawings, the outer skin portion 17 partially surrounds the deformation portion 18c and includes an opening portion 17b. Then, the deformation portion 18c is made of a shape memory metal or a shape memory resin.

Figure 8A:
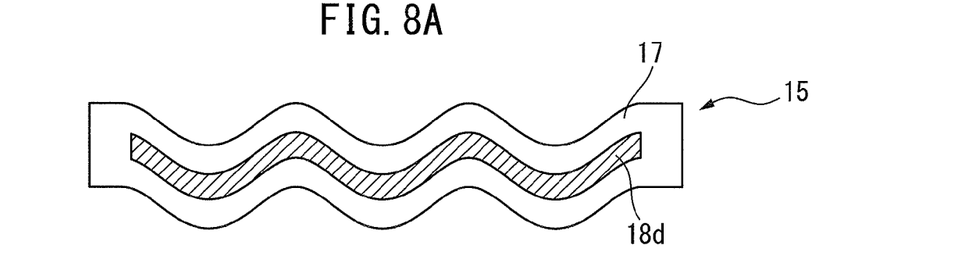
FIG. 8A is a partial cross-sectional view illustrating a fourth example of the first sealing member.
Figure 8B:
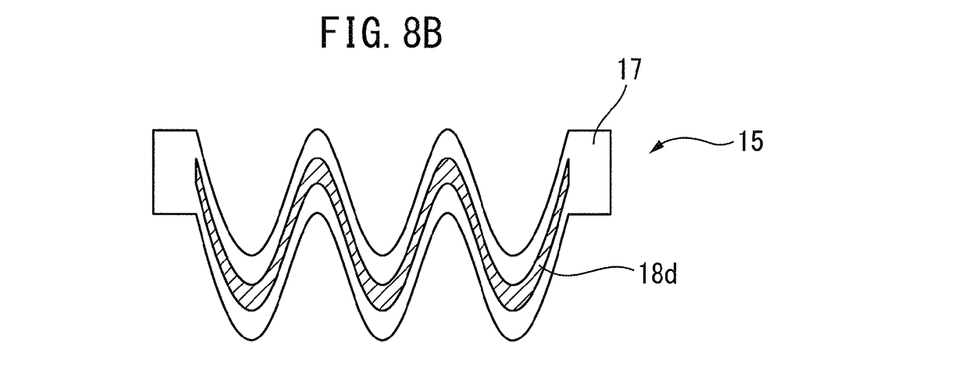
FIG. 8B is another partial cross-sectional view illustrating the fourth example of the first sealing member.

Further, FIG. 8A is a partial cross-sectional view illustrating a fourth example of the first sealing member, and FIG. 8B is another partial cross-sectional view illustrating the fourth example of the first sealing member. The first sealing member 15 as illustrated in FIGS. 8A and 8B includes a deformation portion 18d and the outer skin portion 17 surrounding the deformation portion 18d. Apparent from the drawings, the deformation portion 18d has a waveform-cross section, and the outer skin portion 17 has a shape corresponding thereto. Then, the deformation portion 18d is made of a shape memory metal or a shape memory resin.

In addition, in FIGS. 6A, 7A, and 8A, a state under the atmospheric pressure is illustrated and in FIGS. 6B, 7B, and 8B, a state when a surrounding pressure of the first sealing member 15 lowers is illustrated. An external appearance of the first sealing member 15, positions of the deformation portions 18a-18d, and the like as illustrated in these drawings are substantially similar to those of the first sealing member 15 as illustrated in FIG. 4A.

When the first sealing member 15 and the second sealing member 16 are disposed in the vacuum container 10 as described above and a certain time elapses or a surrounding temperature is changed, for example, as illustrated in FIG. 6B, the deformation portion 18b partially bends upward. Similarly, as illustrated in FIG. 7B, the deformation portion 18c is deformed from the substantially U-shape into a rhombus shape. Further, as illustrated in FIG. 8B, the deformation portion 18d is deformed in such a manner that an amplitude of a waveform increases.

When the deformation portions 18b-18d are thus deformed, the first sealing member 15 itself is accordingly deformed, whereby the first sealing member 15 fills a gap between the tube member 11 and the flange 13 of the insertion member 12. Accordingly, effects similar to those as described above can be obtained.

Figure 9A:
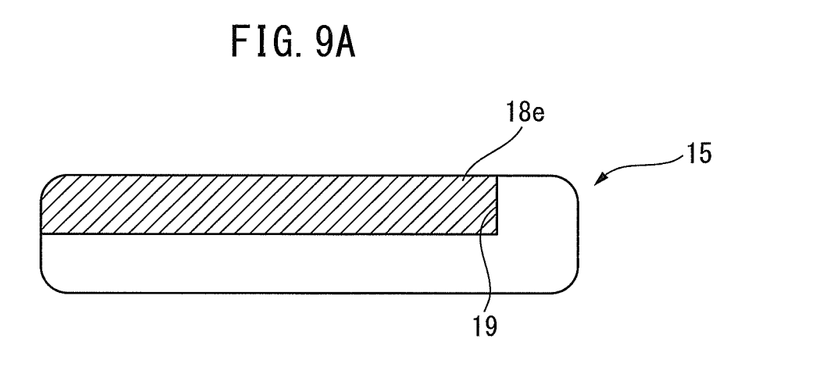
FIG. 9A is a partial cross-sectional view illustrating a fifth example of the first sealing member.
Figure 9B:
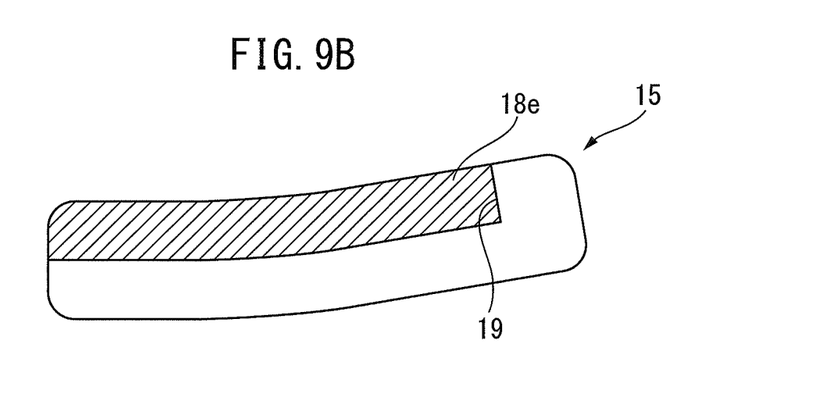
FIG. 9B is another partial cross-sectional view illustrating the fifth example of the first sealing member.

Further, FIG. 9A is a partial cross-sectional view illustrating a fifth example of the first sealing member, and FIG. 9B is another partial cross-sectional view illustrating the fifth example of the first sealing member. In FIG. 9A, a state under the atmospheric pressure is illustrated and in FIG. 9B, a state when a surrounding pressure of the first sealing member 15 lowers is illustrated. An external appearance of the first sealing member 15, a position of a deformation portion 18e, and the like as illustrated in these drawings are substantially similar to those of the first sealing member 15 as illustrated in FIG. 4A.

A cutout 19 is formed in a top surface (an outer peripheral surface) of the first sealing member 15 as illustrated in FIG. 9A. The deformation portion 18e is disposed in the cutout 19. A top surface of the deformation portion 18 is the same plane with the top surface of the first sealing member 15. The deformation portion 18e contains a volatile component.

The first sealing member 15 and the second sealing member 16 are disposed in the vacuum container 10 as described above, and then the vacuum container 10 is evacuated. Thereby, the volatile component gradually volatilizes and, as illustrated in FIG. 9B, the deformation portion 18e is deformed in a manner bending upward. Thereby, the first sealing member 15 itself is deformed, and consequently, the first sealing member 15 fills a gap between the tube member 11 and the flange 13 of the insertion member 12. Accordingly, effects similar to those as described above can be obtained.

Figure 10A:
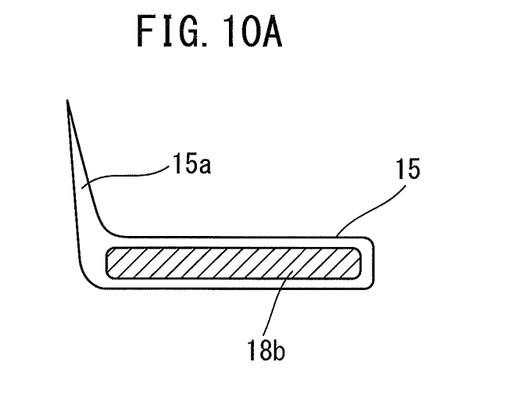
FIG. 10A is a partial cross-sectional view illustrating a sixth example of the first sealing member.

Further, FIG. 10A is a partial cross-sectional view illustrating a sixth example of the first sealing member. As illustrated in FIG. 10A, the first sealing member 15 includes an extension portion 15a extending upward (radially outside) from one end thereof. The extension portion 15a is preferably tapered toward a tip end thereof. Thus, the first sealing member 15 as illustrated in FIG. 10A has a substantially L-shape. Moreover, the first sealing member 15 as illustrated in FIG. 10A includes the deformation portion 18b as described above, but may include any of the other deformation portions 18a and 18c-18e.

Figure 10B:
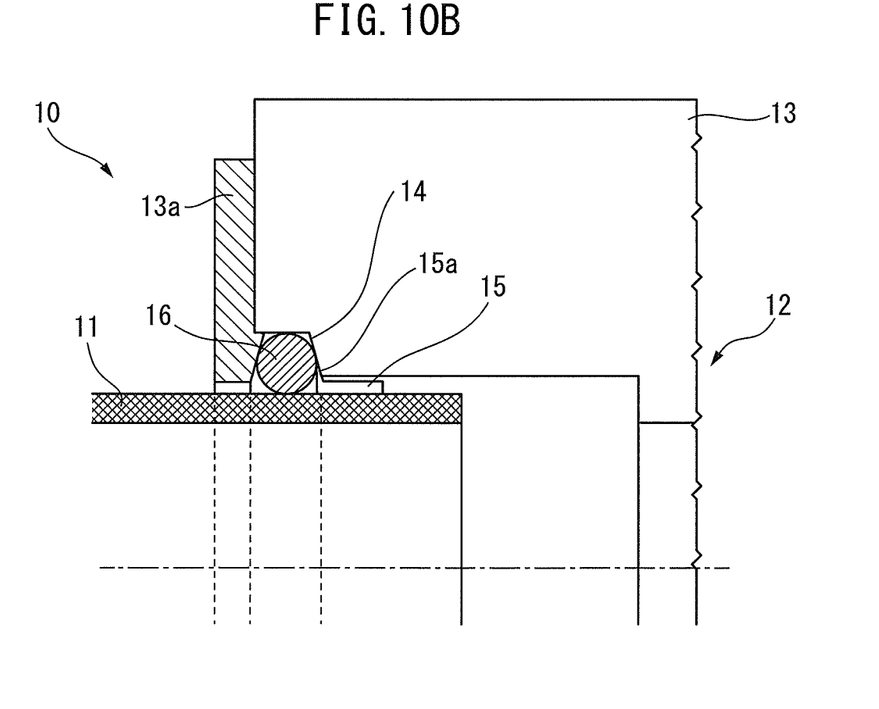
FIG. 10B is a partial cross-sectional view illustrating the vacuum container in which the first sealing member as illustrated in FIG. 10A is disposed.

FIG. 10B is a partial cross-sectional view illustrating the vacuum container in which the first sealing member as illustrated in FIG. 10A is disposed. As illustrated in FIG. 10B, the first sealing member 15 is disposed such that the extension portion 15a is held between the second sealing member 16 and the groove portion 14 of the flange 13. In this case, the first sealing member 15 can be securely fixed in the vicinity of the second sealing member 16. Accordingly, when evacuation is performed, a position of the first sealing member 15 fails to be changed. In addition, the region between the first sealing member 15 and the second sealing member 16 is reduced so that the possibility in which the laser gas is mixed in this region can be decreased. Thus, it is to be understood that the effects as described above can be further enhanced.

Advantageous Effects of Invention

In the first invention, the first sealing member and the second sealing member are disposed and the deformation portion of the first sealing member is deformed after evacuation starts or at the same time evacuation starts, whereby the region between the first sealing member and the second sealing member can be easily evacuated. Consequently, an atmospheric gas in the region between the first sealing member and the second sealing member can be removed. Further, the first sealing member having a high corrosion resistance is disposed on the vacuum side, so that a corrosive gas in a laser gas is prevented from reaching the second sealing member and deterioration of the second sealing member can be further restrained. As a result, an exchange cycle of the first sealing member and the second sealing member can be made to be long.

In the second invention, the first sealing member can be held while a sealing property thereof is enhanced, so that the first sealing member can block a corrosive gas in a laser gas over a long period regardless of the surrounding state.

In the third invention, the first sealing member and the second sealing member are disposed, and then the deformation portion is deformed due to an atmospheric pressure change when evacuation is performed, whereby the first sealing member itself can be deformed.

In the fourth invention, the first sealing member and the second sealing member are disposed, and then a certain time elapses or a surrounding temperature is changed so that the deformation portion containing a shape memory metal or a shape memory resin is deformed, whereby the first sealing member itself can be deformed.

In the fifth invention, the first sealing member and the second sealing member are disposed, and then evacuation is performed so that a volatile component contained in the deformation portion of the first elastic member volatizes, whereby the first sealing member itself can be deformed.

In the sixth invention, a part of the first sealing member, for example, a sheet-shaped part is held between the second sealing member and the insertion member, whereby the first sealing member can be fixed in the vicinity of the second sealing member.

In the seventh invention, a fluorine resin of the first sealing member has a corrosion resistance in comparison with an O-ring made of a fluorine rubber that is the second sealing member, is comparatively easily processed, is a generally distributed material and is easily available. The present invention has been described using typical embodiments, but a person skilled in the art could understand that the modifications as described above and various other modifications, deletions, and additions can be made without departing from the scope of the present invention.

The invention claimed is:

1. A vacuum container of a laser oscillator, the vacuum container comprising:
   a tube having a cylindrical shape or a polygonal cylindrical shape;
   an insertion member into which the tube is inserted; and
   a first sealing member and a second sealing member that are disposed between the tube and the insertion member,
   wherein the first sealing member is made of a material having a corrosion resistance higher than the second sealing member,
   the first sealing member is disposed on a vacuum side relative to the second sealing member,
   the second sealing member is made of a material having a sealing property higher than the first sealing member, and
   the first sealing member at least partially includes a deformation portion that deforms in such a manner as to enhance a sealing property thereof,
   wherein the deformation portion is deformed due to reduction of a pressure around the first sealing member.

2. The vacuum container of the laser oscillator according to claim 1, wherein the deformation portion holds the first sealing member while a sealing property thereof is enhanced.

3. The vacuum container of the laser oscillator according to claim 1, wherein the deformation portion is a shape memory metal or a shape memory resin that is contained in the first sealing member.

4. The vacuum container of the laser oscillator according to claim 1, wherein the deformation portion contains a volatile component and is disposed in a cutout of the first sealing member, and the deformation portion is deformed due to volatilization of the volatile component.

5. The vacuum container of the laser oscillator according to claim 1, wherein a part of the first sealing member is held between the second sealing member and the insertion member.

6. The vacuum container of the laser oscillator according to claim 1, wherein at least a part of the first sealing member is made of a fluorine resin.

* * * * *